(12) United States Patent
Levine et al.

(10) Patent No.: US 6,441,852 B1
(45) Date of Patent: Aug. 27, 2002

(54) EXTENDED DYNAMIC RANGE IMAGE SENSOR SYSTEM

(75) Inventors: Peter A. Levine, West Windsor; Donald J. Sauer, Princeton; Nathaniel J. McCaffrey, Stockton, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/497,898

(22) Filed: Feb. 4, 2000

(Under 37 CFR 1.47)

Related U.S. Application Data

(62) Division of application No. 09/087,087, filed on May 29, 1998, now Pat. No. 6,040,570.

(51) Int. Cl.[7] .............................................. H04N 5/335
(52) U.S. Cl. ........................ 348/302; 348/299; 348/308
(58) Field of Search ................................ 348/294, 296, 348/297, 298, 299, 302, 308

(56) References Cited

U.S. PATENT DOCUMENTS

| | | | | |
|---|---|---|---|---|
| 4,819,070 A | * | 4/1989 | Hynecek | 348/296 |
| 5,276,520 A | * | 1/1994 | Hawkins et al. | 348/299 |
| 5,303,052 A | * | 4/1994 | Narabu et al. | 348/299 |
| 5,410,348 A | | 4/1995 | Hamasaki | |
| 5,461,425 A | * | 10/1995 | Fowler et al. | 348/297 |
| 6,002,123 A | * | 12/1999 | Suzuki | 348/294 |

OTHER PUBLICATIONS

S.K. Mendis et al.; CMOS Active Pixel Image Sensors For Highly Integrated Imaging Systems, IEEE Journal of Solid–State Circuits, US, IEEE Inc., vol. 32, No. 2, Feb. 1, 1997, pp. 187–197.
European Search Report, Jun. 5, 2001.

* cited by examiner

*Primary Examiner*—Andrew B. Christensen
(74) *Attorney, Agent, or Firm*—William J. Burke

(57) ABSTRACT

An extended dynamic range imager. An array of pixels provides an output signal for each pixel related to an amount of light captured for each pixel during an integration period. A row of extended dynamic range (XDR) sample and hold circuits having an XDR sample and hold circuit for each column of the array captures an XDR signal related to a difference between the output signal and an XDR clamp level to which the pixel is reset at a predetermined time before the end of the integration period. A row of linear sample and hold circuits having a linear sample and hold circuit for each column of the array captures a linear signal related to a difference between the output signal and an initial output signal to which the pixel is reset at the beginning of the integration period.

17 Claims, 4 Drawing Sheets

310

320
BRIGHT SCENE (W/XDR)

330
DARK SCENE (NO XDR)

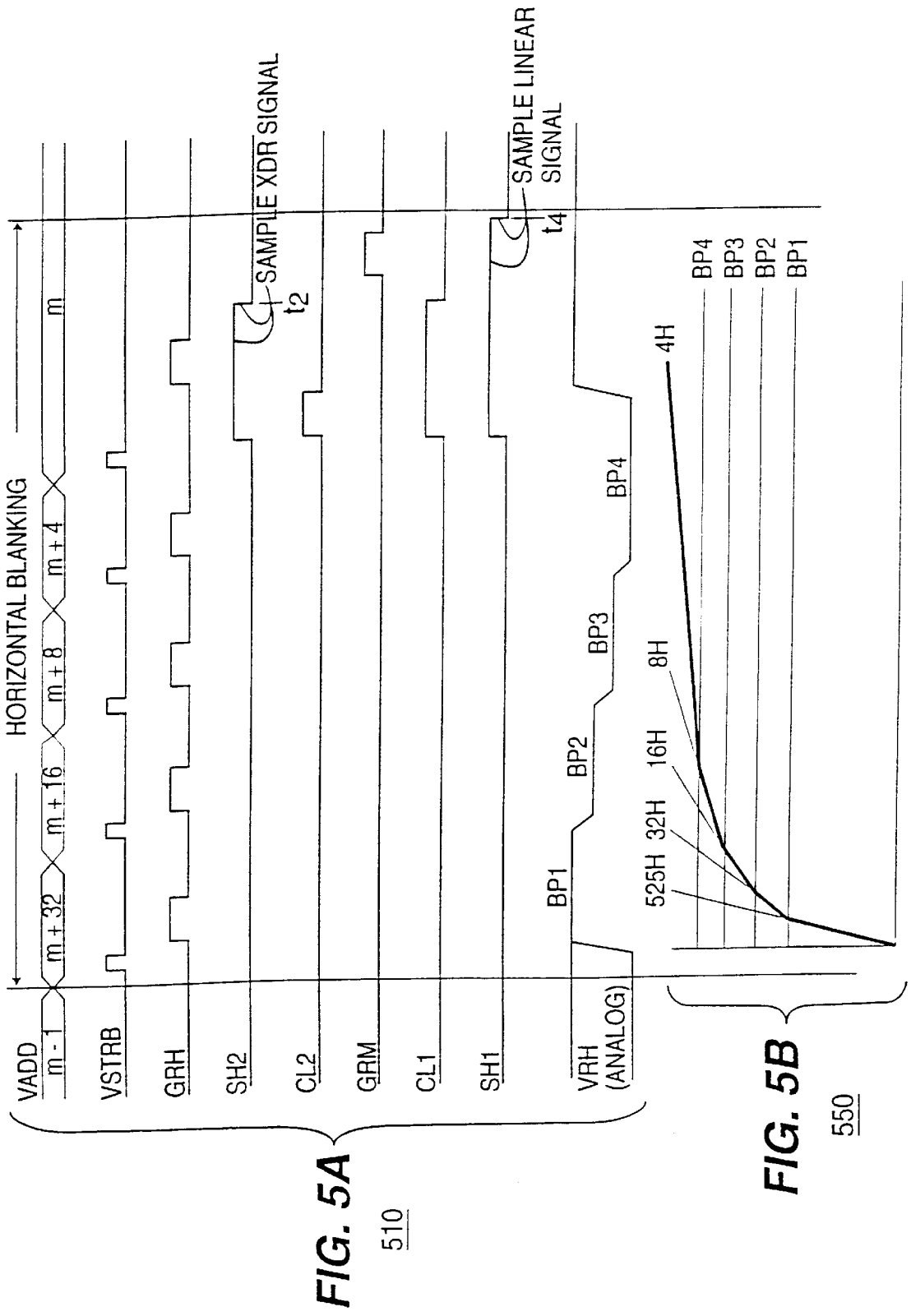

EXTENDED DYNAMIC RANGE IMAGE SENSOR SYSTEM

This applicattion is a Divisional Application of U.S. patent application Ser. No. 09/087,087 filed May 29, 1998 now U.S. Pat. No. 6,040,570.

BACKGROUND OF THE INVENTION

1. Field of the Invention

The present invention relates to imaging systems and, in particular, to imaging systems which increase photodetector charge capacity towards the end of the integration period to extend the dynamic range of the imaging system.

2. Description of the Related Art

The entire disclosure of U.S. patent application Ser. No. 09/087,087, filed May 29, 1998, is expressly incorporated by reference herein Various types of imagers (also sometimes referred to as image sensors) are in use today, including charge-coupled device (CCD) imagers and complementary metal-oxide semiconductor (CMOS) imagers. These devices are typically incorporated into CCD and CMOS imaging systems, respectively. Such imaging systems comprise an array of pixels, each of which contains a light-sensitive sensor element such as a CCD or, in CMOS imagers, a N+ to p-substrate photodiode, a virtual gate buried n-channel photodetector, or a photogate detector. Such light-sensitive sensor elements will be referred to herein, generally, as photodetectors.

CMOS imagers typically utilize an array of active pixel sensors and a row (register) of correlated double-sampling (CDS) circuits or amplifiers to sample and hold the output of a given row of pixel imagers of the array. Each active pixel typically contains a pixel amplifying device (usually a source follower). The term active pixel sensor (APS) refers to electronic image sensors within active devices, such as transistors, that are associated with each pixel. CMOS imagers are often interchangeably referred to as CMOS APS imagers or as CMOS active pixel imagers. The active pixel sensors and accompanying circuitry for each pixel of the array will be referred to herein as APS circuits or APS pixel circuits.

In both CMOS and CCD imager systems, each photodetector accumulates charge and hence voltage during the optical integration period in accordance with the light intensity reaching the relevant sensing area of the photodetector. As charge accumulates, the photodetector begins to fill. The charge stored in a photodetector is sometimes said to be stored in the "charge well" of CCD-type photodetectors. If the photodetector becomes full of charge, then excess charge is shunted off to a "blooming drain," in part to prevent blooming. Blooming is a phenomenon in which excess charge beyond pixel saturation spills over into adjacent pixels, causing blurring and related image artifacts. In a CMOS system, the voltage of, for example, the photodiode, falls in accordance with the negative charge. However, if the photodetector becomes full before the end of the integration period and any additional photons strike the photodetector, then no additional charge can be accumulated (in the case of CMOS, the diode voltage cannot fall any lower). Thus, for example, if very bright light is applied to a photodetector, this can cause the photodetector to be full before the end of the integration period and thus to saturate and lose information.

Each APS circuit produces an output signal at the end of an integration period, which is related to the amount of charge accumulated during the integration period. The amount of charge is in turn related to the amount of light received by the photodetector of the APS circuit during the integration period. The output signal may be sampled and held by a CDS circuit, and then applied to a buffer for signal processing.

U.S. Pat. No. 3,953,733, issued Apr. 27, 1976 to Levine ("Levine"), the entirety of which is incorporated herein by reference, teaches a method of operating CCD imagers to avoid this problem. The voltage applied to the electrodes of a CCD cause a heavily depleted region to form beneath the electrode, which forms "potential wells" or charge wells of a given maximum charge capacity. A greater electrode voltage causes a correspondingly greater charge capacity well to form. The voltage that controls the maximum charge capacity of a photodetector, such as the CCD electrode voltage, will be referred to herein as the charge capacity control voltage, and the maximum charge that can be accumulated in a photodetector will be referred to herein as the photodetector's charge capacity. The charge capacity control voltage is also sometimes referred to as the blooming barrier voltage, since it acts as a blooming drain to remove charge from the pixel photodiode to avoid charge spilling into adjacent pixels during optical overload.

Typically, the charge capacity control voltage applied is constant throughout the integration period, so that a given charge capacity exists throughout the integration period for each pixel of the imager array. In Levine, the charge capacity control voltage is varied during the integration period, so as to increase the optical dynamic range of the CCD imager. Levine thus teaches an extended dynamic range (XDR) system. For example, in one embodiment, Levine teaches increasing the charge capacity control voltage (and hence the charge capacity) in non-linear fashion, by increasing the charge capacity control voltage in discrete steps towards the end of the integration period. Levine also teaches other methods of increasing the charge capacity control voltage and charge capacity towards the end of the integration period to extend the dynamic range of the imaging system, such as using enough multiple discrete steps to implement a continuously increasing charge capacity control voltage; or using linearly increasing charge capacity control voltage waveforms and increasing the slope or slopes of such waveforms.

In a CMOS XDR imager system, each photodetector of the array of photodetectors is configured so as to accumulate charge up to a first maximum charge capacity during a first, majority portion of the integration period. This may be done by resetting a photodiode voltage to an initial voltage at the beginning of the integration period. The voltage then decreases from the initial level as charge accumulates. At a time before the end integration period, the photodiode voltage is pulled up to a second level, in case it has been saturated (i.e., is below the second level). This thus clears the pixel of signal beyond the second level, which allows more charge to be accumulated for the remainder of the integration period. This effectively provides a first charge capacity during the first part of the integration period and an additional charge capacity for the remainder thereof.

Very bright light will thus saturate during the first period and will accumulate again during the second period. The point between the first portion of the integration period and the remainder when saturation occurs (and thus XDR is utilized) may be referred to as the breakpoint. The first portion and charge accumulated during the first portion are associated with a "linear" range, and the remainder portion and any excess charge accumulated during this remainder portion are associated with an "extended" dynamic range. The linear range has higher sensitivity than the XDR, but the XDR allows at least some contrast to be measured for higher light levels that otherwise would have saturated the linear range.

The total accumulated charge may be read out at the end of the integration period by a CDS circuit or other suitable means, which samples and holds the output of a given photodetector of the array. This may be converted to a digital number representative of the total charge. Standard mathematical techniques may then be applied to this information, based on the ratio of the two time periods and related information, to determine the total overall light that has impinged on the corresponding photodetector during the integration period.

CMOS imagers have several advantages over CCD imagers. For example, CCD imagers are not easily integrated with CMOS process peripheral circuitry due to complex fabrication requirements and relatively high cost. By contrast, since CMOS imagers are formed with the same CMOS process technology as the peripheral circuitry required to operate the CMOS imager, such sensors are easier to integrate into a single system-on-chip using integrated circuit (IC) fabrication processes. By using CMOS imagers, it is possible to have monolithic integration of control logic and timing, image processing, and signal-processing circuitry such as analog-to-digital (A/D) conversion, all within a single sensor chip. Thus, CMOS imagers can be manufactured at low cost, relative to CCD imagers, using standard CMOS IC fabrication processes.

Additionally, CCD imagers typically require three different input voltages with separate power supplies to drive them. CCD imagers also require relatively high power supply voltages and thus also require relatively high power to operate. By contrast, CMOS devices require only a single power supply, which may also be used to drive peripheral circuitry. This gives CMOS imagers an advantage in terms of power consumption and external circuitry complexity, and also in terms of the amount of chip area or "real-estate" devoted to power supplies. CMOS imagers have relatively low power requirements because of the relatively low voltage power supply required for operation, and also because only one row of pixels in the APS array needs to be active during readout.

Despite these advantages, however, CMOS imagers also have various disadvantages in comparison to CCD imagers. For example, in CMOS systems there may be mismatches between components of the APS pixel circuits. Such variations in components can cause different photodetectors to have different breakpoints. For example, in a CMOS imager system, the charge capacity of a photodetector may be switched from the first maximum charge capacity to the second maximum charge capacity by use of a reset transistor. (I.e., the reset transistor is used to bring the photodiode voltage up to an initial voltage and then to a second voltage level.) The reset transistors may each have a different threshold associated therewith, which can cause the breakpoint to vary somewhat from the ideal. For example, in CMOS imagers, breakpoints may vary up to approximately 10% to 15% from ideal.

The variation of breakpoints among pixels of the array can give rise to various artifacts, such as the "puddling" and "dirty window" artifacts. Puddling is a "fixed pattern" artifact in which some neighboring pixels appear relatively bright and others relatively dim, since they are produced by falling into the linear or extended dynamic ranges. This causes a structure much like a winding river-type shape to be visible between pixel regions in the linear range and those in the XDR. The dirty window artifact arises in areas of relatively high intensity which utilize the extended dynamic range of the system, since each one may have slightly different DC offsets due to the different breakpoints. This latter artifact is also due in part to the fact that, during linearization of the non-linear piece-wise signal, the XDR components are multiplied by an integer, e.g. on the order of 9, to match the slope of the linear portion, which also multiplies such breakpoint-caused differences in the XDR portions.

Conventional approaches to addressing such problems are not always satisfactory. For example, a frame memory may be utilized to attempt to reduce such artifacts, by correcting for such fixed pattern differences between pixels of the array. However, such approaches may be expensive, complex, or otherwise undesirable in certain applications. Further, some breakpoint and other components or characteristics between pixels may vary with temperature or other variable parameters, making frame memory solutions more complex and expensive, or even unworkable.

SUMMARY

An extended dynamic range imager. In one embodiment, an array of pixels provides an output signal for each pixel related to an amount of light captured for each pixel during an integration period. A row of extended dynamic range (XDR) sample and hold circuits having an XDR sample and hold circuit for each column of the array captures an XDR signal related to a difference between the output signal and an XDR clamp level to which the pixel is reset at a predetermined time before the end of the integration period. A row of linear sample and hold circuits having a linear sample and hold circuit for each column of the array captures a linear signal related to a difference between the output signal and an initial output signal to which the pixel is reset at the beginning of the integration period.

BRIEF DESCRIPTION OF THE DRAWINGS

These and other features, aspects, and advantages of the present invention will become more fully apparent from the following description, appended claims, and accompanying drawings in which:

FIG. 5A is a timing diagram illustrating the signal waveforms used to operate the APS circuit and CDS circuits of FIG. 2 during a horizontal blanking period, in accordance with an alternative multi-breakpoint embodiment of the present invention; and FIG. 5B is a graph illustrating the linear and XDR signal response of the system of FIG. 2, in accordance with the multi-breakpoint embodiment of FIG. 5A.

DESCRIPTION OF THE PREFERRED EMBODIMENT

In the present invention, as described in further detail below, an XDR imaging system reads out both XDR and linear channels from a pixel circuit so that the channels may be spliced together without being adversely affected by variations in breakpoint of the pixel circuit. In one embodiment, the XDR imaging system is a CMOS-based imaging system having an array of APS pixel circuits, which employs at least two separate CDS circuits to provide separate channels for each of the two signal response ranges, linear and XDR. Using this approach, the linear and XDR channels may be spliced together to obtain a signal S that responds linearly to the light intensity over the entire dynamic range up to the saturation limit of the XDR channel, without being adversely affected by variations in breakpoint of the particular APS pixel circuit.

CMOS XDR Imager System

Figure 1:
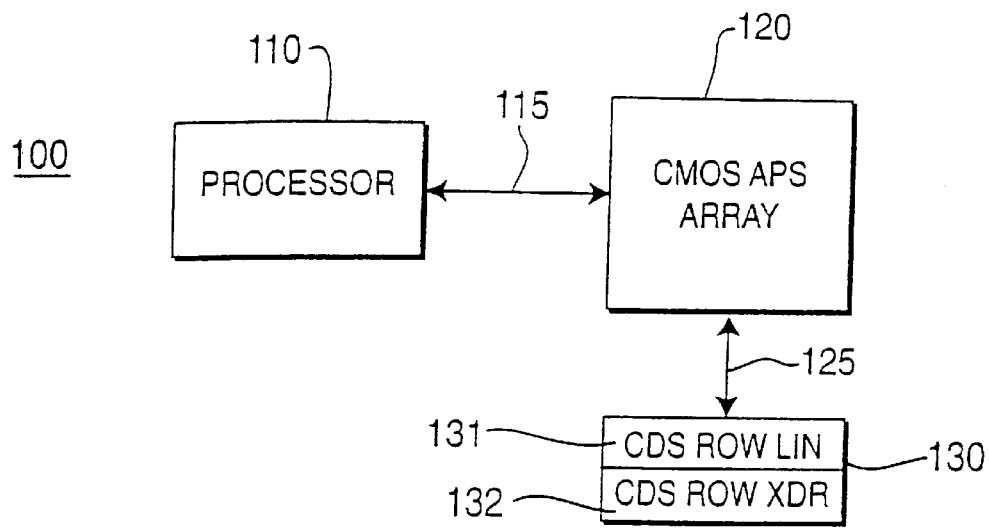
FIG. 1 is a block diagram of a CMOS imager system, in accordance with an embodiment of the present invention.

Referring now to FIG. 1, there is shown a block diagram of a CMOS imager system 100, in accordance with an embodiment of the present invention. Imager system 100 comprises processor 110, CMOS APS array 120 coupled to processor 110 by bus 115, and CDS rows 130, coupled by bus 125 to APS array 120. In one embodiment, APS array 120 may be a 640(H)×480(V) APS array of APS circuits. CDS rows 130 contains two separate rows or registers 131 and 132 of 640 CDS circuits each. Thus, CDS rows 130 contains two CDS circuits, one for the linear channel and one for the XDR channel, for each column of APS array 120. CDS rows 130 thus comprises a dual-register CDS means.

In operation, during a horizontal blanking period preceding display of a given line or row of APS array 120, the given row of APS circuits is activated. Each APS circuit provides an output voltage signal related to the intensity of light that has been applied to the APS circuit's photodetector region during the previous integration period (the period during which the photodetectors integrate charge). In single-CDS row systems, the output signal of each APS circuit of the activated row is sampled and held by the CDS circuit for the same column. Thereafter, the output of each of the 640 CDS circuits is consecutively applied to a buffer, so that the signal for each column may be amplified and, if desired, applied to an A/D converter (not shown) for further signal processing, and displayed on a monitor (not shown). However, in an XDR system, the artifacts described above can be produced. A CMOS imager utilizing a single CDS circuit to sample and hold the output signal for an APS pixel circuit is described in U.S. patent application Ser. No. 08/867,577, filed Jun. 2, 1997 (for "CMOS Imager with Reduced Fixed Pattern Noise," attorney docket no. SAR 11994, inventor Sauer, Donald Jon), the entirety of which is incorporated herein by reference. Further, in addition to the Levine reference mentioned previously, another XDR imaging system, employing either a CCD or CMOS imager, is described in U.S. patent application Ser. No. 08/867,652, filed Jun. 2, 1997 (for "Extended Dynamic Range Imaging System and Method," attorney docket no. SAR 12217, inventors McCaffrey, Nathaniel Joseph, et al.), the entirety of which is also incorporated herein by reference.

In an embodiment of the present invention, therefore, a dual-register CDS means, having two rows of CDS circuits and thus two CDS circuits per column, is used to read the separate linear and XDR channels of a given APS pixel after the integration period, so as to eliminate or reduce the effects of different pixel breakpoints, as described in further detail below.

CMOS Imager Circuitry

Figure 2:
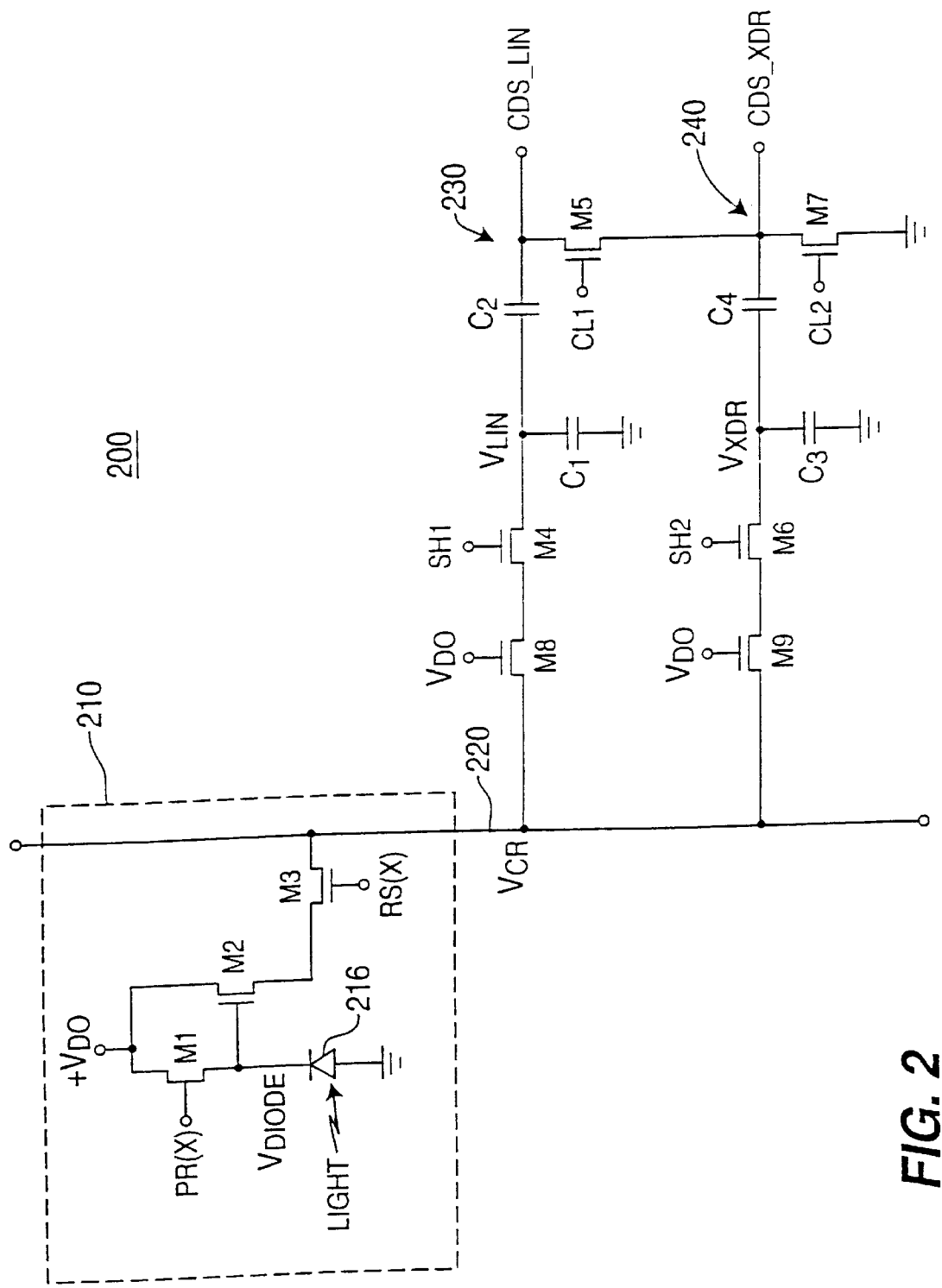
FIG. 2 is a circuit diagram illustrating an APS circuit of the APS array of the system of FIG. 1, and a linear CDS circuit and extended dynamic range (XDR) CDS circuit of the CDS rows the system of FIG. 1, in further detail.

Referring now to FIG. 2, there is shown a circuit diagram 200 illustrating a CMOS imager APS circuit or pixel 210 of APS array 120, and of linear CDS circuit 230 and XDR CDS circuit 240 of CDS rows 130, of FIG. 1, in further detail. APS circuit 210, which represents one pixel of APS array 120, comprises photodetector 216 and three NMOS field-effect transistors M1, M2, and M3. In one embodiment, photodetector 216 is an N+ to p-substrate photodiode. APS circuit 210 is also coupled to bus lines supplying the following signals provided by processor 110: phase reset signal PR(x) and row select RS(x). (The parenthetical symbol (x) refers to the x-y coordinate system describing columns (the x coordinate) or rows (the y coordinate) of the APS pixel array, which allows selected columns and rows of the array to be specified for activation.)

Photodetector 216 is electrically coupled between ground and the source terminal of transistor M1 and the gate terminal of transistor M2. The gate terminal of transistor M1 is coupled to the PR signal line, and the drain terminal of transistor M1 is coupled to source voltage $V_{DO}$ (e.g., +5V), which is also coupled to the drain terminal of transistor M2. The source terminal of transistor M2 is coupled to the drain terminal of transistor M3, the source terminal of which is coupled to CDS circuits 230, 240 via the column read (Col_Read(x)) line 220. The gate terminal of transistor M3 is coupled to the RS signal line.

Transistors M2 and M3 are used to output onto line 220 a voltage $V_{CR}$, which is a known multiple of voltage $V_{DIODE}$, whenever the RS signal is high, during read out of the signal corresponding to the light signal charge accumulated. Transistor M2 is used as a source follower to drive column read line Col_Read(x) in selected rows. Transistor M3 serves to isolate APS circuit 210 from line 220 when other rows of APS array 120 are being read.

Reset transistor M1 (preferably an NMOS transistor) is used to reset $V_{DIODE}$ to a given level under control of input signal PR. For example, a PR signal of 7V brings $V_{DIODE}$ up to approximately 5V, if it is lower than 5V. A PR signal of 3.5V brings $V_{DIODE}$ up to approximately 3.5V, if it is lower than 3.5V; however, if $V_{DIODE}$ is more than 3.5V, e.g. 4V, then a PR signal of 3.5V has no effect on $V_{DIODE}$. This is because, for $V_{DIODE} \geq 3.5V$, there is not enough integrated signal charge on photodiode 216 to cause conduction of reset transistor M1, since $V_{DIODE}$ does not fall below the value Vrm−Vtn, where Vtn is the NMOS conduction threshold of reset transistor M1.

This may be used to reset $V_{DIODE}$ before the beginning of an integration period, or to reset $V_{DIODE}$ to the XDR clamp potential (e.g., 3.5V) at the beginning of the second portion of the integration period. A similar resetting operation may be used during readout of the XDR channel, as described in further detail below.

APS circuit 210, in one embodiment, is formed from 0.5 μm CMOS single-polysilicon, triple-metal (SPTM) process design rules and technology. This may be used, for example, to form a 640(H)×480(V) APS array having a 4.8×3.6 mm image size, which is compatible with ⅓" optics; or a 640(H)×480(V) APS array having a 3.6×2.7 mm image size, which is compatible with ¼" optics.

In alternative embodiments, other types of photodetectors may be utilized for photodetector 216 instead of a photodiode, such as virtual gate buried n-channel photodetector or a photogate detector. Although a virtual gate photodetector provides better blue response than do polysilicon photogates, fabrication of virtual gate detectors requires two additional implantation steps compared to the normal CMOS process, and therefore may not be feasible with some existing low-cost IC fabrication processes.

Switched Capacitor CDS Circuits

Each of CDS circuits 230, 240, contains similar components and intercouplings. Linear CDS circuit 230, for example, contains transistor M8, coupled at its gate to $V_{DO}$, transistor M4, coupled at its gate to sample and hold signal SH1, and capacitors C1 and C2, intercoupled as illustrated. Transistor M5 is coupled at its gate to clamp signal CL1. Circuit 230 outputs the linear, or $CDS_{LIN}$, signal. Similarly, circuit 240 outputs the XDR signal $CDS_{XDR}$. Processor 110 provides the various phase reset, row select, clamp, and sample and hold signals applied to the components of APS pixel circuit 210 and CDS circuits 230, 240, through buses 115, 125.

A current source (not shown) preferably is coupled in series with line 220, which provides a 20 µA load current. Each of capacitors C1, C2, C3, and C4 preferably has a capacitance of 1 pF. In CDS circuit 230, capacitors C1 and C2, with accompanying transistors or switches M4 and M5, are used to implement the linear CDS function for each column, and to perform horizontal read out to a buffer.

The function of CDS circuit 230 is to capture and provide a CDS output voltage $CDS_{LIN}$ that indicates the change in APS output voltage $V_{CR}$ on line 220 corresponding to the linear channel. In order to do this, the change in APS output voltage $V_{CR}$ must be reflected in the CDS output voltage $CDS_{LIN}$. As will be appreciated by those skilled in the art, this voltage change may be reflected by a voltage $V_{LIN}$ across capacitor C1 by first sampling and holding voltage $V_{CR}$ on line 220 before applying the APS output voltage thereto by switching on transistor M3. Then, transistor M3 is switched on by row select signal RS, which changes the voltage $V_{CR}$ on line 220. This change is thus reflected in the voltage stored on capacitor C2. As will be appreciated, the $CDS_{LIN}$ signal may be gated out, for example to a buffer (not shown) when desired by switching off transistor M4 to isolate capacitors C1 and C2 from APS circuit 210 and col_read line 220, so that they form a series capacitance, and the APS output voltage is represented as a net signal charge stored in the series connection of capacitors C1 and C2. This may be read out in a known way to enable a processor to determine the signal change output by APS circuit 210.

Similarly, CDS circuit 240 may be operated to capture $CDS_{XDR}$ that indicates the change in APS output voltage $V_{CR}$ on line 220 corresponding to the XDR channel. The operation of CDS circuits 230, 240 are described in further detail below with reference to FIGS. 3A–C.

Operation of APS Circuit and Switched Capacitor CDS Circuits

Figure 3A:
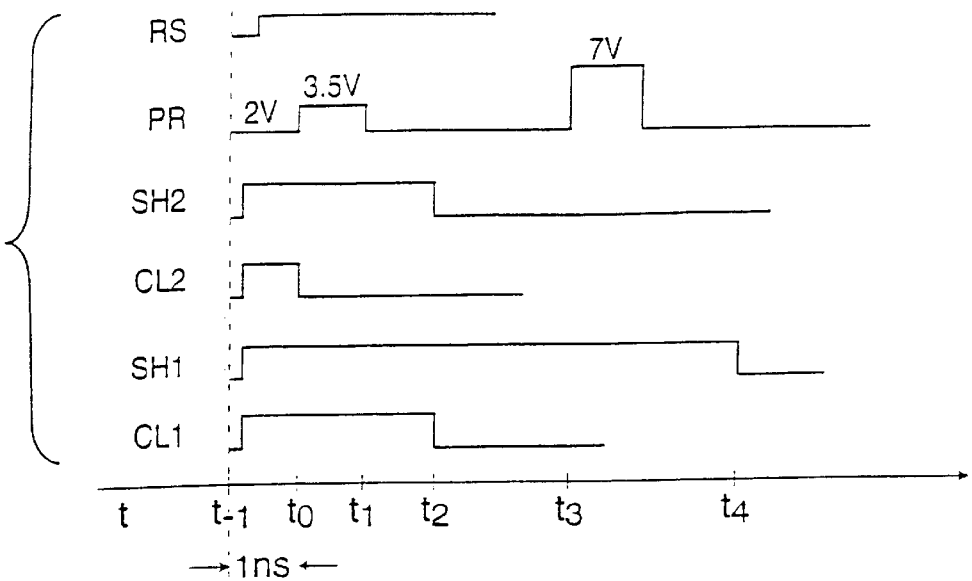
FIG. 3A is a timing diagram illustrating the signal waveforms used to operate the APS circuit and CDS circuits of FIG. 2 during a horizontal blanking period, in accordance with an embodiment of the present invention.
Figure 3B:
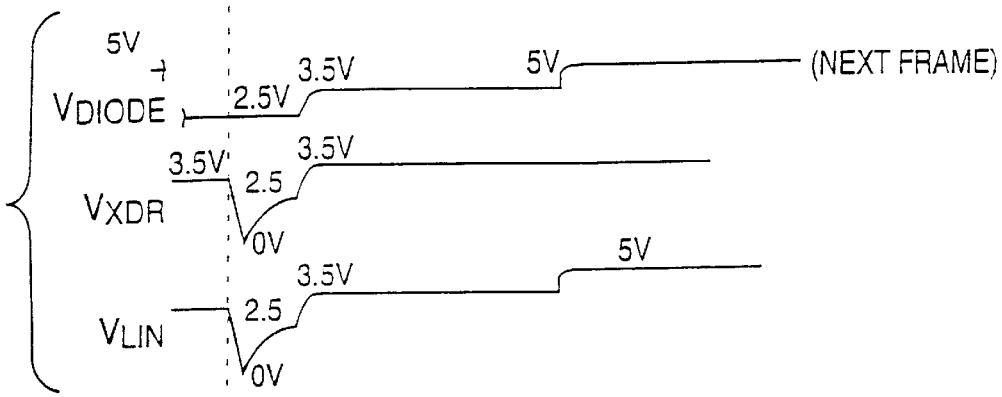
FIGS. 3B–C illustrate exemplary voltage signals of the APS circuit and CDS circuits of FIG. 2 produced during a bright scene utilizing XDR and a dark scene that does not utilize XDR, respectively.
Figure 3C:
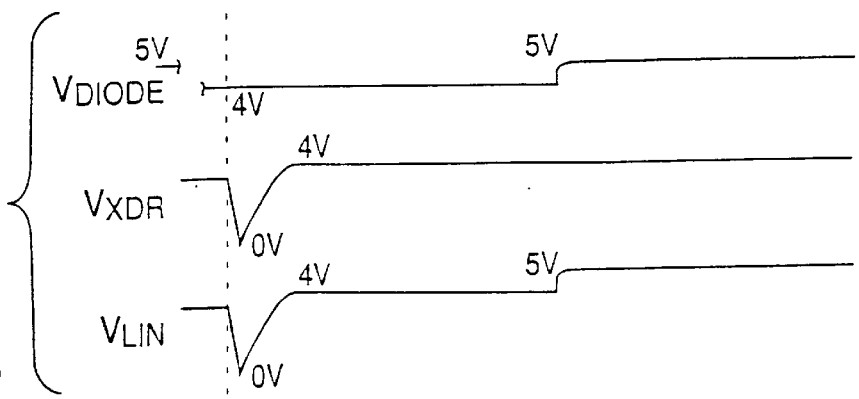

Referring now to FIG. 3A, there is shown a timing diagram 310 illustrating the waveforms used to operate APS circuit 210 and CDS circuits 130 of FIG. 2 during a horizontal blanking period, in accordance with the present invention. FIGS. 3B and 3C illustrate exemplary voltage signals of APS circuit 210 and CDS circuits 130 of FIG. 2 produced during a bright scene utilizing XDR and a dark scene that does not utilize XDR, respectively. As will be understood, the input signals RS, PR, CL1, SH1, CL2, and SH2, are generated by signal generation circuitry, such as general-purpose programmed processor 110.

Preceding the horizontal blanking period for the current row, photodetector 216 has been accumulating, or "integrating," charge in accordance with the light intensity reaching the surface area of photodetector 216, during the preceding integration period. The integration period begins after the row containing APS circuit 210 is reset after the previous read of the row, typically ⅓₀ or ⅙₀ second previously, depending upon the frame display rate. At this time, PR pulses to 7V, brining $V_{DIODE}$ up to an initial 5V level (the "initial diode reset level"), which gradually decreases during the integration period depending on the light impinging on photodiode 216. After a row is read, each APS circuit is reset once again by the signal on line PR being switched from 2V to 7V, which brings $V_{DIODE}$ up to 5.0V, so that during the next frame, light is once again accumulated during another integration period.

During the integration period, as photons impinge upon the surface area of photodetector 216, a negative charge accumulates, thereby lowering the initial diode reset level of 5.0V in accordance with the intensity of the light integrated during this period. This voltage can reach a minimum of approximately 2.5V before saturation occurs (the "minimum diode level"). In one embodiment, a 1.5V signal variation of $V_{DIODE}$ between 5.0V and 3.5V is used for the linear range, and the remaining 1V signal variation between 3.5V and 2.5V can be used for XDR (and also for linear range for lower levels of light). This may be implemented by resetting $V_{DIODE}$ to an XDR reset voltage (e.g., 3.5V) a short time before the end of the integration period, thus dividing the integration period into first and second periods. For example, for a 500H (500 scan line) integration period, at 450H $V_{DIODE}$ is reset to an XDR reset voltage of 3.5V. (1H is the period of the horizontal line rate, nominally 63.5 µs for NTSC standard video rates.) Thus, if $V_{DIODE}$ had fallen to below 3.5V at time 450H due to bright light, the linear channel has saturated and $V_{DIODE}$ is reset to 3.5V. (As will be appreciated, this is analogous to increasing the charge capacity of a CCD pixel in CCD imaging systems.) Thus, in the remaining 50H of the integration period, $V_{DIODE}$ can fall from 3.5V so as to allow some contrast to indicate the bright light that has saturated the linear range. If, however, $V_{DIODE}$>3.5V, $V_{DIODE}$ will not be changed by the resetting operation at 450H.

Thus, at the beginning of the horizontal blanking period, $V_{DIODE}$ will be in the range of 5.0V to 2.5V (i.e., between the initial diode reset level and the minimum diode level). If $V_{DIODE}$ is below the XDR clamp potential (3.5V), then the difference between $V_{DIODE}$ and 3.5V will represent the component accumulated after 450H, which will be an XDR component if there was saturation of the linear channel. As explained above, various techniques may be used to determine the total overall light that has impinged on photodetector 216 during the integration period. For example, the relative times of the XDR and linear portions may be designated as $T_{XDR}$ and $T_{LIN}$, respectively. In the foregoing example, these times are 50H and 500H (i.e., 50H+450H), respectively. As will be appreciated, assuming a relatively constant light level during the integration period, as long as $CDS_{XDR} \leq (T_{XDR}/(T_{LIN}-T_{XDR}) \cdot CDS_{LIN}$, then it can be assumed that the linear channel was not saturated. In this case, the total output linear signal S is simply $CDS_{XDR}+CDS_{LIN}$. However, if $CDS_{XDR}>(T_{XDR}/(T_{LIN}-T_{XDR}) \cdot CDS_{LIN}$, this implies that the linear channel saturated. In this case, splicing must be performed, as described in further detail below, to obtain a signal S that responds linearly to the light intensity over the entire dynamic range up to the saturation limit of the XDR channel.

Referring once more to FIGS. 3A–C, time $t_{-1}$ designates a time just after the end of the integration period and just before the beginning of the readout of the XDR and linear channels. Prior to time $t_{-1}$, in both the bright scene case and dark scene case, $V_{DIODE}$ has decreased from an initial voltage of 5V to a lower voltage depending on how much light impinged on diode 216 during the integration period. In FIG. 3B, the bright scene case, $V_{DIODE}$ has fallen to 2.5V, well below the 3.5V reset voltage to which diode 216 was reset just 50H before the end of the 500H integration period. The linear component corresponding to the first period is thus (5−3.5=) 1.5V and the XDR component is (3.5−2.5=) 1.0V. In FIG. 3C, the dark scene case, $V_{DIODE}$ has fallen only to 4.0V, which is above the 3.5V reset voltage level. Thus, in this case, there is no XDR component, and the linear component is (5−4=) 1.0V. In both cases, the dual CDS circuits 230, 240 are controlled by control signals such that output signal S is produced, and is not affected by small variations in the XDR reset voltage.

At time $t_{-1}$, signals CL1, SH1, CL2, and SH2 pulse on. This turns on switches or transistors M4, M5, M6, and M7, which resets VXDR and $V_{LIN}$ to 0V, since at this point RS is still off and thus $V_{CR}$ is 0V. A short time later, RS is pulsed on, thus applying the APS output voltage to $V_{CR}$. I.e., in the bright scene case, $V_{CR}$ changes from 0V to 2.5V (FIG. 3B); in the dark scene case, $V_{CR}$ changes from 0V to 4.0V (FIG. 3C). Since the right-side terminal of capacitors C2 and C4 are also coupled to ground at this time, they also have the same voltages $V_{LIN}$ and $V_{XDR}$ applied thereacross, respectively, as are applied across capacitors C1 and C3, respectively.

Next, at time $t_0$, clamp signal CL2 (for XDR CDS circuit 240) switches low, thereby opening switch M7 and thus holding a reference voltage $V_{C4}$ onto capacitor C4 equal to the initial APS output voltage $V_{CR}$ (i.e., 2.5V and 4.0V for the bright and dark scenes, respectively). Just after time $t_0$, PR then switches to 3.5V, to bring $V_{DIODE}$ up to the XDR clamp level (3.5V), if necessary. Thus, in the bright scene, $V_{CR}$, and thus $V_{LIN}$ and $V_{XDR}$, rise to 3.5V from 2.5V (FIG. 3B), a rise of 1V (which corresponds to the XDR component of the APS output signal). However, since M7 is open, $V_{C4}$ does not change, and thus stays at 2.5V, thus causing $CDS_{XDR}$ to increase by the difference, or 1.0V (3.5V−2.5V). In the dark scene, however, $V_{CR}$, and thus $V_{LIN}$ and $V_{XDR}$, do not change, since these voltages are already at 4.0V and thus cannot be "pulled up" to 3.5V.

At time $t_1$, phase reset signal PR turns off, and, a short time later, at time $t_2$ both sample and hold signal SH2 and clamp signal CL1 turn off. Turning off SH2 thus holds onto $V_{XDR}$ the XDR signal, with the difference of 1.0V held as $V_{C4}$. Turning off CL1, however, opens switch M5 and thus holds a reference voltage $V_{C2}$ onto capacitor C2 equal to the linear portion only of the signal, since $V_{DIODE}$ has already been pulled up to the XDR clamp level (3.5V), if necessary. E.g., in the bright scene case, $V_{C2}$ and $V_{LIN}$ are 3.5V, the saturated linear level for the first 450H portion of the integration period; and 4V in the dark scene case.

At time $t_3$, phase reset signal PR pulses to 7.0V, to bring $V_{DIODE}$ and thus $V_{CR}$ up to the initial level of 5.0V. In the bright scene case, $V_{LIN}$ thus rises from 3.5V to 5.0V; and in the dark scene, from 4.0V to 5.0V. $V_{XDR}$ does not change in either case since SH2 (and thus transistor M6) has already been turned off. Further, because M5 is open, when $V_{LIN}$ rises 5.0V, $V_{C2}$ does not change. Thus, $CDS_{LIN}$ increases by the difference between 5.0V and the previous $V_{LIN}$ (i.e., 3.5V or 4.0V in the bright and dark scenes, respectively). Next, at time $t_1$ sample and hold signal SH1 turns off, thus causing $V_{LIN}$ to float. At this point, the linear and XDR signals $CDS_{LIN}$ and $CDS_{XDR}$ may be read out. The total linearized output signal may be reconstructed as explained in further detail below with reference to FIG. 4.

Figure 4:
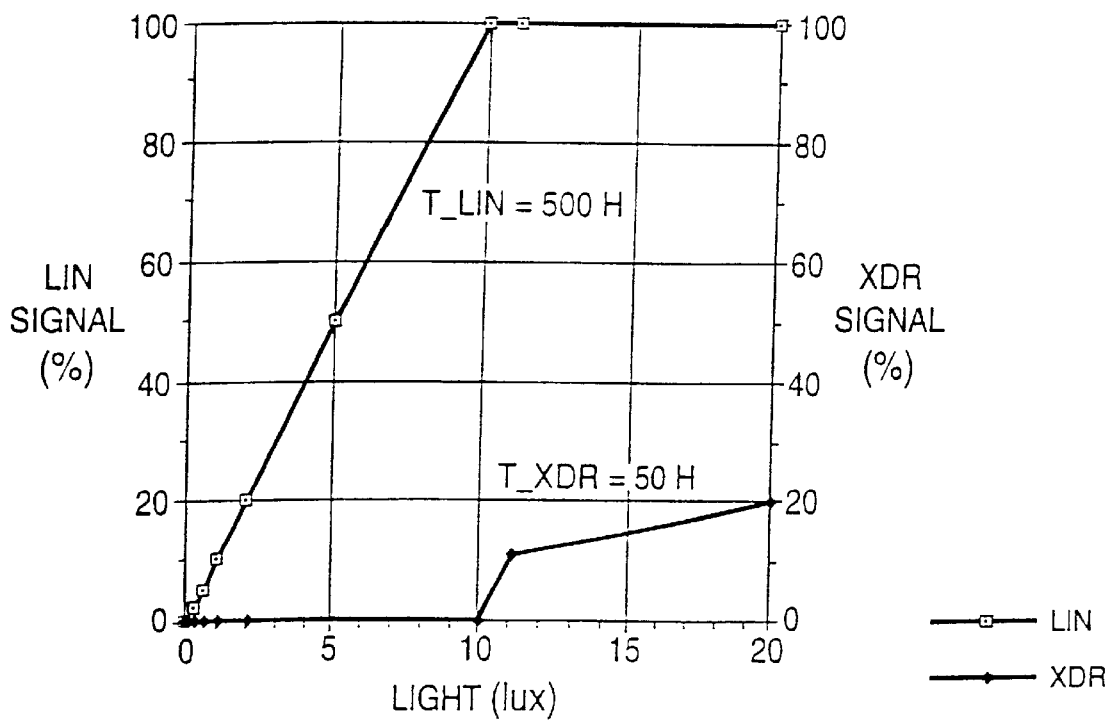
FIG. 4 is a graph illustrating the linear and XDR signal response of the system of FIG. 1.

Referring now to FIG. 4, there is depicted a graph 400 illustrating the linear and XDR signal response of the system 100 of FIG. 1. For light up to 10 lux, the linear channel will not be saturated. However, for light beyond this point, the linear channel is saturated, and $V_{DIODE}$ will have fallen below 3.5V and thus will be reset to the XDR clamp potential at 450H. In this case the XDR of the system is employed, in which case a breakpoint occurs in the signal response at approximately 11 lux. The breakpoint does not occur exactly at 10 lux, as will be appreciated, since $V_{DIODE}$ may be just at 3.5V exactly at 450H and thus not quite saturated, in which case additional light falling at a similar intensity in the remaining 50H portion of the integration period adds to the linear signal. Thus, for bright scenes, a breakpoint occurs at approximately 11 lux. Beyond the 11 lux point, the slope of the XDR channel is only a fraction of that of the linear channel, with the ratio measured by the integration time ration $T_{XDR}/T_{LIN}$=50/500=0.1. Thus, the XDR channel has one-tenth the slope of the linear channel.

The linear and XDR channels may be digitally spliced together to obtain a signal which responds linearly to the light intensity over the entire dynamic range up to the XDR channel saturate limit (e.g., 100 lux in this case). In one embodiment, the following algorithm may be employed for this splicing operation:

If $CDS_{XDR} \le (T_{XDR}/(T_{LIN} - T_{XDR}) \cdot CDS_{LIN}$ {i.e., if there was no saturation of the linear channel; i.e. $I \le 11$ lux} then $S = CDS_{LIN} + CDS_{XDR}$; {combine the signal accumulated in both portions of the integration period}

If $CDS_{XDR} > (T_{XDR}/(T_{LIN} - T_{XDR}) \cdot CDS_{LIN}$ {if there was saturation of the linear channel} then $S = CDS_{LIN} + CDS_{XDR} + (T_{LIN}/T_{XDR})[CDS_{XDR} - (T_{XDR}/(T_{LIN} - T_{XDR})) \cdot CDS_{LIN}]$ {combine the signal accumulated in both portions of the integration period} where S is the spliced signal combining the linear and XDR channels.

In the present invention, therefore, the XDR channel is sampled by the XDR CDS circuit 240, and the linear channel is sampled by the linear CDS circuit 230. XDR CDS circuit 240 samples the entire signal change, clamps this value, and then resets the pixel to drain off the XDR amount, and then samples this new value. XDR CDS circuit 240 thus samples and stores the change in the XDR component, which is reflected in $CDS_{XDR}$ (at time $t_0$). However, the change is with respect to the actual XDR clamp potential of the pixel (APS circuit 210), even if this is different from the ideal of 3.5V. This difference signal accurately corresponds to the actual change in $V_{DIODE}$ caused by photons striking after diode 216 was reset to the clamp potential at 450H, because at this time diode 216 was reset to the actual, not ideal, XDR clamp potential as well. Thus, the XDR signal sampled and held by XDR CDS circuit 240 is an accurate reflection of the XDR signal even though the XDR clamp potential is different from the ideal. This is thus more accurate than if only a single CDS circuit were used, when the difference information would be lost.

Thereafter, the actual XDR clamp potential is itself stored in linear CDS circuit 230 as a reference, and the pixel is then reset completely to the initial diode reset level (ideally, to 5V). However, again, if the XDR clamp potential (ideally 3.5V) is off by, say, 0.1V, then it is also likely that the initial diode reset level will also be off by a similar amount, so that the difference between the actual initial diode reset level and the actual XDR clamp potential will be closer to the same difference for neighboring pixels, even if the XDR clamp potentials vary from one another. For a single CDS circuit readout system, with an XDR system, information about where the breakpoint is, is lost, and thus variations between pixels are greater.

Thus, the present invention can eliminate or reduce breakpoint differences, as will be appreciated. The present invention, therefore, advantageously allows the extended dynamic range combined signal response to be provided while reducing the adverse effects caused by inter-pixel breakpoint-related differences, such as differences in the XDR clamp potential, as will be appreciated by those skilled in the art.

For example, assume a manufacturing difference for APS circuit 210 causes the XDR clamp potential to be 3.4V instead of the ideal of 3.5V. The output signals will be illustrated here for both the ideal XDR clamp potential (3.5V) case and the assumed actual XDR clamp potential (3.4V) case, using the bright scene case of FIG. 3B as an example.

If the XDR clamp potential is 3.5V, then we have the numeric examples shown in, and discussed above with reference to, FIG. 3B. In the example given, it was presumed that $V_{DIODE}$ fell to 2.5V at the end of the integration period. This means that $V_{DIODE}$ dropped 1.5V (5.0V–3.5V) during the first 450H portion of the integration period, and an additional 1.0V (3.5V–2.5V) during the second 50H portion. Since, according to the equations described above, $1.0V > (50/(500-50)) \cdot 1.5 = 0.17$, this implies that the linear channel saturated. Using 1.5V and 1.0V and the ratio between the first and second portions of the integration period (i.e., $T_{LIN}$ and $T_{XDR}$), a linear signal response can be reconstructed.

If the XDR clamp potential is, however, 3.4V, then the following occurs. In the 3.5V case, $V_{DIODE}$ fell by 1.0V due to the light impinging upon pixel circuit 210, during the last or second 50H portion of the integration period. Because the XDR clamp potential was 3.5V (ideal), the 1.0V delta caused the final $V_{DIODE}$ to 2.5V. In the 3.4V case, however, at 450H the XDR clamp potential is 3.4V, and a fall of 1.0V causes $V_{DIODE}$=2.4V. (Although the ideal minimum diode level is 2.5V, lower limits may be able to be reached, especially slightly smaller levels on the order of variations in the XDR clamp potential; further, if a given APS circuit 210 has a non-ideal XDR clamp potential, its minimum diode level may also be non-ideal.) Thus, since XDR CDS circuit 240 uses the actual XDR clamp potential 3.4V to capture the XDR signal, it still captures the delta 1.0V, the same as captured in the ideal, 3.5V case. Because a majority of the error giving rise to the above-described artifacts is introduced due to errors in the XDR signal (because the error is multiplied many times when re-linearizing the overall signal response), capturing the accurate XDR signal in this manner largely reduces these artifacts.

Similarly, for capture of the linear signal by linear CDS circuit 230, the difference between the actual initial diode reset level and the actual XDR clamp level is captured. The actual initial diode reset level may be 4.9V in this case, instead of the ideal 5.0V, for the same or similar reasons that the actual XDR clamp potential is 3.4V instead of 3.5V. Thus, by capturing the difference between the two (4.9V–3.4V=1.5V), the signal from the first portion is captured, which is the same as that which would be captured in the ideal case. More accurate capture of the linear signal also helps reduce the above-described artifacts. Nevertheless, even in cases where the linear signal still contains some error due to breakpoint differences, the present invention reduces the major portion of the artifact and error due to the XDR signal, as described above.

Multiple Breakpoint XDR Systems

In the embodiments described above, it is presumed that a single-breakpoint, dual-slope XDR system is employed, having two separate CDS circuits, one for each slope of the signal response characteristic. In alternative embodiments, a multi-breakpoint system may be employed to help reduce artifacts generated when only two slopes (and one breakpoint) are employed. Such artifacts may arise due to sharp peaks in the derivative of the imager response at the breakpoint, especially if there is a large difference between the linear and XDR channel gain. Even if it is possibly to seamlessly reconstruct (splice) the separated linear and XDR channel components, the additional gain of the XDR channel may be high enough so that the random noise of that channel is visible above the shot noise of the signal in the linear channel. Thus, a relatively smooth non-linear compression characteristic which approximates a logarithmic (or other) response may be provided by using a piece-wise linear response with multiple breakpoints.

In such a system, N breakpoints are employed, having N+1 segments, or slopes, i.e. the first, linear segment, and N additional XDR segments. The associated signals for each segment may be read out in any number of channels, from 1 to N+1. As will be appreciated, the choice of the number of signal channels allows a tradeoff between system complexity and pixel-to-pixel matching of the individual breakpoints. Thus, for example, two channels may be employed, as in system 100 described above, even for a multiple-breakpoint system; or more than two, up to N+1, channels and thus CDS circuits may be employed.

In general, for N breakpoints, C=N+1 CDS circuits will provide the ability to reconstruct the linear signal response, taking into account pixel-breakpoint variations and thus reducing artifacts that would normally arise due to inter-pixel differences in these breakpoints. If C<N+1, then the last CDS circuit is used to reconstruct N+2−C>1 segments, thereby reducing the ability to compensate for inter-pixel differences in the breakpoints between these segments. However, for later breakpoints—in fact, for all breakpoints past the first—the change in slope between adjoining segments becomes relatively small, thus reducing the artifacts produce by inter-pixel breakpoint matches. In one embodiment of a multi-breakpoint system, there, only two CDS circuits may be employed, one for the linear response and the other for the XDR response of all other slopes.

In one embodiment, the method employed in reading out the signal into two channels for a single breakpoint suppresses the first order Vt variations in the pixel reset transistor M1. (Further details concerning reconstruction of a multi-breakpoint XDR signal response may be found in the Levine reference and in U.S. patent application Ser. No. 08/867,652, both mentioned previously.) This allows a splicing algorithm to reconstruct a linear signal response over an extended optical input dynamic range which is useful in imager systems employing color filter arrays since the responsivity of each pixel depends on the color bandpass. In another embodiment, in a monochrome system where relinearization of the response is not critical, a single channel readout which contains the entire N+1 segment piece wise linear response may be used, along with time multiplexing.

The method of reading out a CMOS APS imager to obtain an N+1-segment piece wise linear signal response is described in further detail as follows. The N+1-segment piece wise linear signal response can be separated into any number of signal channels, from 1 to N+1, as described above, and the associated readout method may be logically divided into two parts.***

First, the non-linear response is controlled as described in Levine, for CMOS type imager systems. Thus, the integration time of the separate segments in the response is achieved by addressing a row in the imager M(x) line times before it is read out (i.e. before the end to the integration period) and momentarily raising the row reset line (e.g., PR in FIG. 2) to a value of VM(x), where M(x+1)>M(x) and VM(x+1)>VM(x); where M(x) is an integer value which may vary from 1 to the total number of lines in a frame. This operation may be conveniently and is preferably performed during the horizontal blanking period of a line time, in a system having an architecture which provides for random addressing of rows. Approximately 1 $\mu$s may be required to latch a new row address and pulse the row select and momentarily raise the row reset line in the selected row to VM(x). Therefore, at a system having a 30 frame per second (fps) readout rate using a horizontal blanking period of 10 $\mu$s, it is possible to have about five breakpoints and still allow 5 $\mu$s for the dual-CDS readout operations described above.

Second the integrated charge stored in the pixel is read out into a number of channels ranging from 1 to N+1, by using a CDS circuit for each signal channel, which clamps to the value of the pixel after the row reset line is pulsed to a value of VM(x) and then samples the value of the pixel after the row reset line is pulsed to a value of VM(x+1). The multiple sets of CDS circuits in each column are thus loaded with respective signals during the horizontal blanking period, and may be read out in parallel during the active line time, as described in further detail below with reference to FIGS. 5A–B.

Referring now to FIG. 5A, there is shown a timing diagram 510 illustrating the signal waveforms used to operate APS circuit 210 and CDS circuits 130 of FIG. 2 during the horizontal blanking period, in accordance with an alternative multi-breakpoint embodiment of the present invention. FIG. 5B is a graph 550 illustrating the linear and XDR signal response of system 100 of FIG. 1, in accordance with the multi-breakpoint embodiment of FIG. 5A. As will be appreciated by those skilled in the art, the input signals Vadd, Vstrb, Grh, CL1, SH1, CL2, SH2, Grm, and Vrh are generated by signal generation circuitry, such as general-purpose programmed processor 110. At approximately time $t_2$, the XDR signal is sampled, when SH2 switches low. At approximately time $t_4$, the linear signal is sampled, when SH1 switches low. In FIG. 5A, signals Vadd is the Vertical Shift Register row address; signal Vstrb is the Vadd latch pulse and will enable RS of the selected row; signal Grh pulses the reset gate signal PR with a voltage equal to Vrh (7V); signal Grm pulses the reset gate signal PR with a voltage equal to Vrm (3.5V nominal); and signal Vrh is an analog signal that turns the transistor on fully and charge the diode up to 5V (cleared). Vrm will turn the transistor on and charge the diode up to Vrm–Vth (XDR clear, or clamp level) leaving the linear signal alone. The signals m, m+32, m+16, et seq. are row addresses. By addressing 32 lines ahead of the current read out line m, the signal can be cleared for a reduced integration time of 32 lines. Either the XDR or linear signal can be cleared. By clearing the linear signal, the XDR signal is by default cleared, so that linear clearing has to be performed with an offset line address greater than the XDR clear line offset address. For instance, the linear signal can be cleared 32 lines ahead and the XDR 16 lines ahead, but not the opposite. In addition, in this embodiment, the pixel may be cleared without running the signal through the CDS circuit.

Referring now to FIG. 5B, graph 550 shows the signal response for a 4-breakpoint, 5-segment system, having breakpoints BP1, BP2, BP3, and BP4. BP1 corresponds to the first 525H of a 585H system, and BP2 occurs 32H later, and so forth Thus, a more smooth, logarithmic-approximating signal response is provided by using multiple breakpoints. In the embodiment illustrated in FIGS. 5A–B, only two CDS circuits are employed, one for the linear response and the other for the XDR response of all other slopes (i.e., for those segments past BP1). Thus, in this embodiment, the dual-register CDS means of CDS rows 130 of FIGS. 1 and 2 may be employed for signal readout.

In another embodiment, multiple segments are employed but only a single channel and CDS circuit is employed per column, and time multiplexing is used to readout the different signal response segments. This embodiment requires more complexity and a higher horizontal readout clock rate for the same operating frame rate of the imager In alternative embodiments, the algorithm presented above for providing spliced signal S may be modified to minimize dark noise. For example, to prevent the dark noise component in the XDR channel from appearing in the spliced output signal S for low light levels, the XDR channel may be "muted" when the linear signal $CDS_{LIN}$ is below a relatively high fixed threshold, e.g. 80% of the saturation level, when the shot noise of the linear signal is substantially higher than the dark noise of the XDR channel.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An extended dynamic range (XDR) imager, comprising:
    an array of pixels for providing an output signal for each pixel related to an amount of light captured for each pixel during an integration period;
    circuitry that resets the pixels in a selected row of the array to an initial output signal value before the integration period begins and that applies an XDR clamp level signal to the pixels in a selected row of the array of pixels at a predetermined time before the integration period ends;
    a row of sample and hold circuits having a sample and hold circuit for each column of the array for capturing, during a first time interval, an XDR signal for each column of the selected row that is related to a difference between the output signal and the XDR clamp level signal, and for capturing, during a second time interval distinct from the first time interval, a linear signal for each column of the selected row, the linear signal being related to a difference between the initial output signal and the greater of the output signal and the XDR clamp level signal.

2. An XDR imager according to claim 1, wherein:

the circuitry that applies the XDR clamp level to the pixels in a selected row of the array of pixels applies a plurality of respectively different XDR clamp level signals, including a first XDR clamp level signal, to the selected row at a respective plurality of times before the integration period ends; and the row of sample and hold circuits captures, during a plurality of successive distinct time intervals, a respective plurality of XDR signals, each related to a respective one of the plurality of XDR clamp level signals and captures, during a further time interval distinct from the plurality of successive time intervals, a linear signal for each column of the selected row, the linear signal being related to a difference between the initial output signal and the greater of the output signal and the first XDR clamp level signal.

3. An XDR imager according to claim 2, wherein each of the sample and hold circuits includes first and second correlated double-sampling (CDS) circuits for storing respective ones of the XDR signals and the linear signals.

4. An XDR imager according to claim 3, wherein the first and second CDS circuits are switched capacitor CDS circuits.

5. An XDR imager according to claim 2, wherein the pixels are complementary metal-oxide semiconductor (CMOS) pixels each having a photodiode having a photodiode voltage that decreases from an initial photodiode voltage in response to light signals impinging on the photodiode.

6. An XDR imager according to claim 2, wherein the imager is characterized by a piece-wise linear signal response having a linear portion corresponding to the entire integration period and having a plurality of XDR portions corresponding to the respective plurality of times before the integration period ends.

7. An XDR imager according to claim 1, wherein the initial output signal is approximately 5V and the XDR clamp level is approximately 3.5V.

8. An extended dynamic range (XDR) pixel for capturing light during an integration period, comprising:

a photodetector to accumulate electric charge responsive to the light during the integration period and generate an output signal based on an amount of the accumulated charge; and a reset circuit having a drain electrode coupled to a voltage source, the reset circuit coupled to the photodetector to set the photodetector to a predetermined level one of i) before the integration period and ii) during the integration period, wherein a control signal is provided to a gate electrode of the reset circuit, the control signal having a voltage level at a beginning of the integration period such that the photodetector has a potential equal to the predetermined level, and during the integration time the gate of the reset circuit is set to a voltage less than that necessary to set the potential of the photodetector to the predetermined level, whereby when the amount of charge accumulated by the photodetector provides a potential that exceeds a further predetermined level, the reset circuit sets the photodetector to the predetermined level.

9. An XDR pixel according to claim 8, wherein the control signal has a varying voltage.

10. An XDR pixel according to claim 8, wherein the control signal has a plurality of levels during the integration period.

11. An XDR pixel according to claim 8, further comprising a signal amplifier coupled to the photodetector to amplify the output signal of the photodetector.

12. An XDR pixel according to claim 8, wherein the XDR pixel is one of a plurality of XDR pixels.

13. An XDR pixel according to claim 12, wherein the plurality of XDR pixels is a linear array of XDR pixels coupled to a scan register.

14. An XDR pixel according to claim 12, wherein the plurality of XDR pixels is a two dimensional array, a first dimension of the array coupled to a row scanner and a second dimension of the array coupled to a column scanner.

15. An XDR pixel according to claim 12, wherein the plurality of XDR pixels are complementary metal-oxide semiconductor (CMOS) pixels.

16. An XDR pixel according to claim 8, wherein the XDR pixel is a complementary metal-oxide semiconductor (CMOS) pixel.

17. An XDR pixel according to claim 8, wherein the photodetector is a photodiode.

* * * * *